Patented Mar. 28, 1933

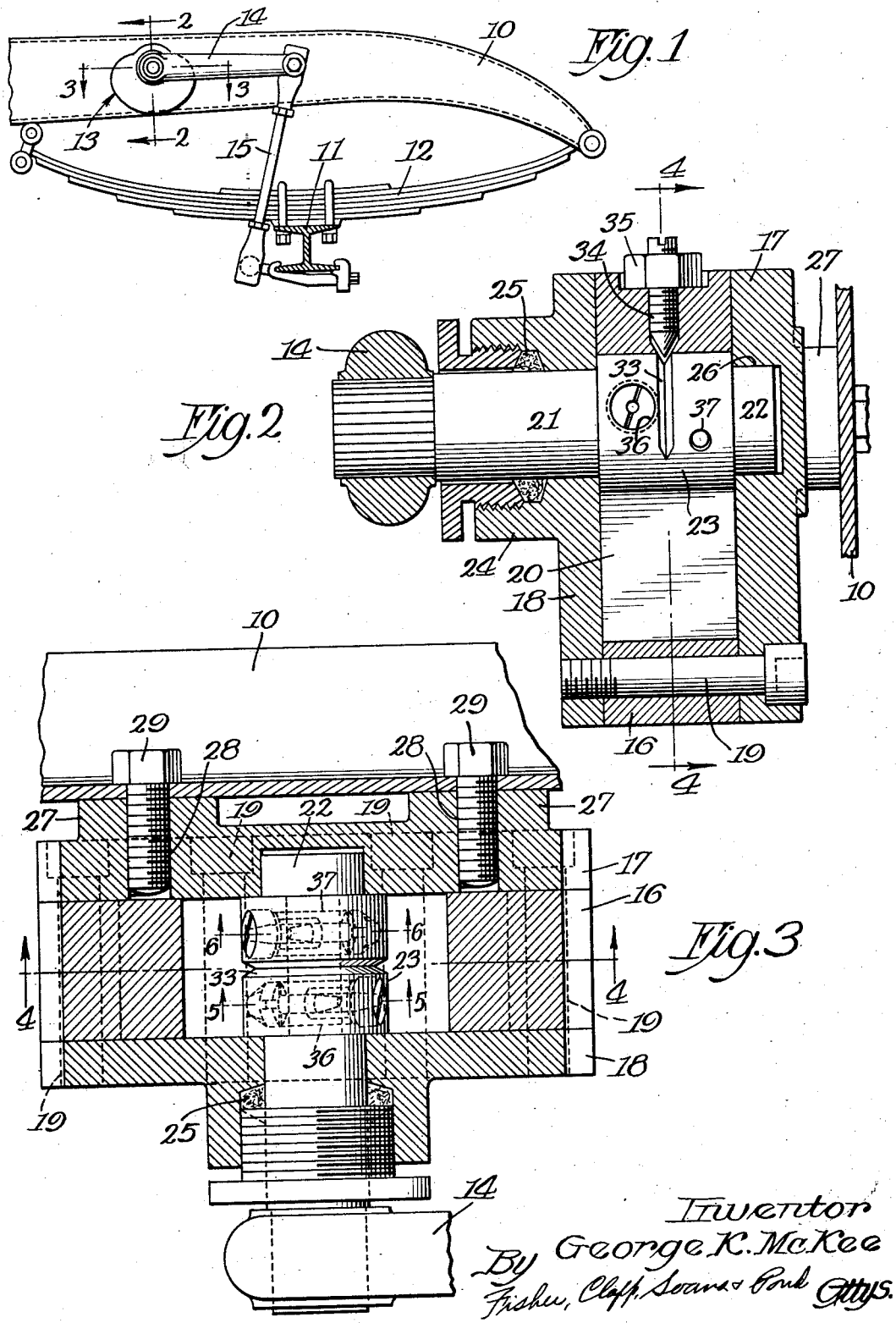

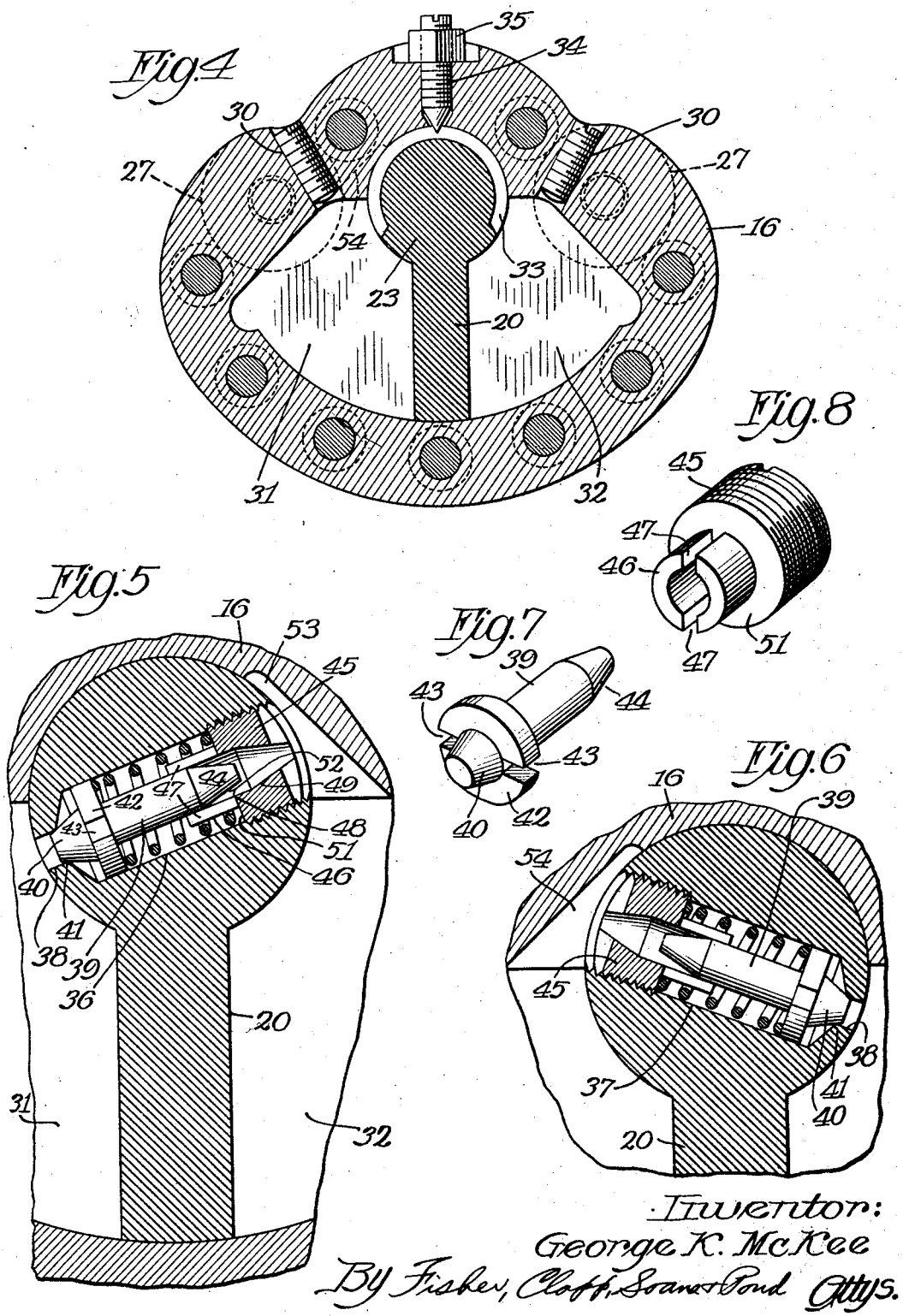

1,903,006

UNITED STATES PATENT OFFICE

GEORGE KENNETH McKEE, OF CINCINNATI, OHIO

SHOCK ABSORBER

Application filed June 15, 1931. Serial No. 544,423.

This invention relates to a hydraulic shock absorber in which liquid is forced from one chamber to another and serves as a cushioning medium for eliminating shocks incident to movement of a vehicle over humps or depressions which, in the absence of a shock absorber, would have a tendency to cause the body of the vehicle to rock or sway on its spring supports.

The main objects of the invention are: To provide a shock absorber which will be efficient in its operation whether the vehicle on which it is mounted is moving over comparatively smooth roads or extremely rough roads; to provide an arrangement which will also be highly efficient for its intended purpose, regardless of the load carried by the vehicle; to provide a shock absorber construction which is comparatively simple and economical to manufacture and which is easy to maintain in effective, operative condition and to adjust to suit varying climatic conditions; and, in general, it is the object of the invention to provide an improved shock absorber of the class described.

Other objects and advantages of the invention will be understood by reference to the following specification and accompanying drawings (two sheets) in which a shock absorber embodying my improved construction is illustrated.

In the drawings:

Fig. 1 is a side elevation illustrating the normal application of my improved shock absorber;

Figs. 2 and 3 are sections on the lines 2—2 and 3—3, respectively, on Fig. 1;

Fig. 4 is a section on the line 4—4 of Fig. 2, the location of this section being also indicated by the line 4—4 on Fig. 3;

Figs. 5 and 6 are sections on the lines 5—5 and 6—6, respectively, on Fig. 3, and Figs. 7 and 8 are perspective illustrations of certain valve parts constituting parts of my improved shock absorber.

Referring now to the drawings, I have shown in Fig. 1 the front end portion 10 of a vehicle frame. It may be assumed that the frame portion constitutes a part of an automobile frame. The front wheels of the vehicle are carried by an axle 11 which is secured to a conventional form of leaf spring 12, the latter being secured at its ends to the frame 10 in any approved manner. My improved shock absorber is designated 13 in its entirety and is secured to the frame 10 by means which will hereinafter be described. The shock absorber 13 is connected to the wheel-carrying axle 11 through the agency of an arm 14 which is connected to and actuates the interior mechanism of the shock absorber, and a link 15 which is connected at its free ends to the free end of the arm 14 and the axle 11 by any improved means.

The present invention is concerned particularly with the construction of the shock absorber 13, which is shown in detail in Figs. 2 to 8 inclusive.

By reference to Figs. 2 and 3, it will be seen that the shock absorber includes a housing or casing formed of a cylindrical member 16 and a pair of separate or independent cylinder heads 17 and 18, respectively. The cylinder 16 is interposed between the cylinder heads 17 and 18, and these parts are bolted together by means of bolts such as indicated at 19. It will be understood that the term "cylinder" is here used in a broad sense to describe any form of cylinder in which a piston operates. A wing or vane type piston 20 is mounted for oscillation in the cylinder through the agency of an integrally formed shaft which includes opposite end portions 21 and 22 and an enlarged intermediate portion 23, all of which are preferably formed integral with the wing element 20. The cylinder head 18 is formed with an outwardly extending boss 24 which is apertured to provide the bearing for receiving the shaft portion 21. The boss 24 is also recessed, as clearly shown in Fig. 2, so as to form a stuffing box 25 for preventing leakage around the shaft portion 21. The arm 14 is splined or keyed to the outer end of the shaft portion 21 so that the shaft and wing piston are movable in unison with the arm 14. The other cylinder head member 17 is provided with a recess 26 which constitutes a bearing for receiving the other shaft end 22. As shown, the recess 26 does not extend through the head 17, so that there can be no leakage of liquid from the casing at this point. The cylinder head 17 is also provided with outwardly extending bosses 27 which are adapted to be seated on the face of the vehicle frame member 10 and serve to space the device outwardly from the frame a suitable distance. The cylinder head 17 may be provided with tapped openings in the bosses 27, as indicated at 28, to receive fastening bolts 29, whereby the shock absorber is securely attached to the vehicle frame.

The cylinder member 16 is provided with filling openings 30, 30 through which a heavy oil or liquid such as glycerine may be injected into the cylinder on opposite sides of the wing piston 20 which divides the interior of the cylinder into a pair of chambers, designated 31 and 32, respectively. Suitable screw plugs may be provided for closing the filling openings 30 when the chambers 31 and 32 are filled with the desired liquid.

In the event that the vehicle passes over a bump or depression in the road which causes vertical movement of the axle 11 relative to the frame, it will be seen that the piston 20 will be caused to oscillate within the cylinder so as to vary the capacity of the respective chambers 31 and 32. For cushioning the movement of the axle 11 when only slight irregularities in the road are encountered, a by-pass or groove 33 is provided in the enlarged shaft portion 23. The groove 33 is preferably V-shaped in cross section and a needle-valve type of screw 34 is adjustably mounted in the cylinder for co-operating with the by-pass 33 to control the passage of fluid therethrough. A lock nut 35 serves to hold the adjusting screw 34 in the desired position. The by-pass 33 is operative to permit the flow of liquid from either cylinder chamber to the other, and hence may be termed a two-way restricted by-pass.

When larger irregularities are encountered in the road, it is found that a restricted by-pass such as just described is insufficient to permit sufficient flow of liquid from one chamber to the other to adequately or efficiently cushion the shock incident to such a larger irregularity. For permitting a sufficient flow of liquid in such a case, while, at the same time, preserving the cushioning effect to be obtained from the liquid, I provide a pair of auxiliary passages 36 and 37, respectively. These auxiliary passages extend through the enlarged shaft portion 23 on opposite sides of the by-pass 33, as will be evident from an inspection of Figures 2 and 3.

The auxiliary passage 36 is provided at its inlet end with an opening 38 of smaller size than the main portion of the passage 36 (see Fig. 5), and an elongated plunger type check valve 39 is mounted in the passage 36. The inlet end of the plunger 39 is provided with a conical portion 40 which is designed to seat against the corner 41 formed by the reduced-size opening 38, and a collar 42, preferably formed integral with the plunger adjacent its inlet end, serves to guide the plunger by reason of its sliding fit in the passage 36. The collar 42 is preferably slotted, as indicated at 43, and it is preferable that the combined area of the slots be less than the area of the opening 38.

The discharge end of the plunger 39 is also tapered or cone-shaped, as shown at 44, and it is slidably received by a guide member 45 which is screwed into the discharge end of the passage 36, as clearly shown in Fig. 5. The guide member 45 is provided with a projecting sleevelike portion 46 which is slotted as shown at 47. The sleeve 46 slidably receives the discharge end portion of the valve 39, and the slots 47 serve to permit liquid to flow between the conical end 44 of the plunger and the corner 48 at the bottom of each of the slots 47. The guide member 45 is also provided with a conical-shaped reduced discharge opening 49, which is preferably of such size that the tapered end 44 of the plunger would seat therein in the event that the plunger is caused or permitted to move to as great an extent as is necessary for such seating. A coil spring 50, disposed around the plunger 39 and between the shoulder or end wall 51 of the guide member 45 and the inner face of the collar 42, serves to normally urge the plunger valve to closed position. In the event that the spring 50 breaks, the restricted discharge opening 49 would serve to prevent the plunger from moving outwardly therethrough to such an extent that the end of the plunger could engage and possibly damage the cylinder wall.

The passage 37 is provided with a similar check valve structure, but it is arranged to act in the opposite direction, i. e., to permit the flow of liquid in the direction opposite to that in which liquid is permitted to flow through the passage 36. Also, it will be observed that the respective check valves and passages 36 and 37 are arranged in oppositely inclined but similar angles to the length of the wing piston 20.

When a large depression or bump in the road is engaged so that great pressure is placed upon the liquid in one of the chambers, for instance, the chamber 31, the pressure of the liquid acts against the end of the check valve 39 (Fig. 5) to unseat or open the same, whereupon the liquid flows past the seat 41, through the slots 43, through the slots 47 and between the conical surface 44 and the corner 48, and thence into the other chamber 32. It will be noted that the volume or rate of flow of liquid through the passage 36 is controlled partly by the width of the opening between the conical surface 44 and the corner 48. The extent of this opening, indicated by the arrows 52 in Fig. 5, is greatest during the initial opening of the valve and is gradually closed as the valve is moved from its normal closed position. By thus gradually decreasing the size or the effective cross-sectional area of the passage 52, the movement of the piston 20 and exterior parts connected thereto is gradually and smoothly cushioned and checked. It will be observed that the greater the pressure applied to open the check valves, the quicker the closing action at the passage 52. Since the structure is self accommodating to variations in pressure, it will be seen that variations in the load carried by the vehicle will have but little, if any, appreciable effect on the efficiency of the device.

As clearly shown in Figures 4, 5 and 6, the cylinder member 16 is recessed, as shown at 53 and 54, respectively, for co-operating with the passage-ways 36 and 37. The recesses 53 and 54 serve to maintain communication from one chamber to the other through the respective check valves when the piston is swung to an off-center position. The recesses 53 and 54 are preferably arranged so that the respective passage-ways will be cut off when the piston has moved through an angle of approximately thirty degrees from its normal or intermediate vertical position, as shown in Figures 4, 5 and 6.

When the shock absorber is mounted on an automobile, it will be so adjusted that the wing piston 20 occupies substantially the vertical intermediate position shown in Figure 4. The piston will be displaced to one side of the normal intermediate position according to the weight of the load carried by the vehicle, and fluctuation of the piston will occur in both directions from the offset position. Cut-offs for the valves are provided so as to prevent the flow of fluid from one chamber to the other to prevent the piston from striking against the cylinder walls in the event that a sharp bump in the road is encountered. By reason of the symmetrical construction of my improved device, it will fit interchangeably, front and rear, and right and left sides of a vehicle.

Changes may be made in the above described structure without departing from the spirit of my invention, the scope of which should therefore be determined by reference to the following claims, the same being construed as broadly as possible consistent with the state of the art.

I claim as my invention:

1. A hydraulic shock absorber comprising a casing and a piston therein and having a restricted by-pass and an auxiliary passage for the flow of liquid around the piston, and a pressure-operated valve normally closing said auxiliary passage and arranged to gradually restrict the flow through said passage as the valve is moved away from its normal closed position.

2. A hydraulic shock absorber comprising a casing and a co-operating piston and having an adjustably restricted by-pass and an auxiliary passage for the flow of liquid around the piston, a spring-held check valve normally closing the auxiliary passage, and means associated therewith for gradually reducing the effective cross-sectional area of said passage as the check valve is moved away from normal position.

3. A hydraulic shock absorber comprising a casing and a co-operating piston and having a two-way restricted by-pass and two one-way auxiliary passages for the flow of liquid around the piston, and oppositely acting, pressure-operated check valves normally closing the auxiliary passages, each check valve being arranged to gradually restrict the flow through the corresponding passage as it is moved away from its normal closed position.

4. A hydraulic shock absorber comprising a casing, a piston therein forming two variable-volume pressure chambers, a pair of pressure-operated check valves normally spring-held in closed position for controlling the flow of fluid in opposite directions between said chambers, and means associated with each valve for restricting the flow of liquid as the valve is moved away from its normal position.

5. A hydraulic shock absorber comprising a casing, a piston therein forming two variable-volume pressure chambers, means forming a restricted by-pass and two auxiliary passages between said chambers, and oppositely acting, spring-held plunger valves normally closing the auxiliary passages and each arranged, by its movement away from its normal closed position, to gradually reduce the effective cross-sectional area of the corresponding passage.

6. A hydraulic shock absorber comprising a casing, a wing piston therein having two one-way passages for the flow of liquid around the piston, oppositely acting, pressure-operated check valves normally closing said passages, and means associated with each valve for gradually restricting the flow through the corresponding passage as the valve is moved away from its normal position.

7. A hydraulic shock absorber comprising a casing, a wing piston therein having a hub or bearing portion provided with two one-way passages extending therethrough, oppositely acting check valves controlling the flow through said passages, and means for closing the respective passages as the piston approaches the ends of its movement.

8. A hydraulic shock absorber comprising a casing, a wing piston therein having a hub or shaft portion provided with a restricted two-way by-pass and two one-way auxiliary passages, and spring-held check valves controlling the flow through the respective auxiliary passages, the casing wall being arranged to close said passages and said by-pass as the piston approaches the ends of its movement.

9. A hydraulic shock absorber comprising a casing formed of a cylinder and independent cylinder heads bolted to the opposite ends of said cylinder, a wing piston disposed within said cylinder between said heads, said cylinder having a shaft, one end of which is mounted for rotary movement in a recess provided in one of said cylinder heads, and the other end of which extends through a bearing opening in the other of said heads so as to project outwardly therefrom for receiving an actuating arm, said shaft being provided intermediate the width of said piston with a restricted by-pass for permitting liquid to flow around said shaft from one side of the piston to the other, and said shaft being provided with a pair of passage-ways respectively located on opposite sides of said by-pass and disposed in oppositely inclined angular relation to the length of the piston, and oppositely acting check valves respectively associated with said passage-ways to permit liquid to flow through said shaft from one side of the piston to the other to equalize the pressure of the liquid on opposite sides of the piston, and means associated with said check valves for gradually retarding the flow of liquid through said passage-ways as the respective valves are moved from closed position.

10. A hydraulic shock absorber comprising a casing and a wing piston mounted in said casing so as to be movable to vary the capacity of the chambers on opposite sides of the piston, said piston having a restricted by-pass permitting liquid to flow in either direction around said piston from one chamber to the other, said piston also having a pair of passage-ways extending therethrough, oppositely acting, spring-closed check valves respectively disposed in said passage-ways for permitting the flow of liquid through the respective passage-ways in opposite directions, each of said check valves including an elongated plunger having at one end an enlarged collar slidably fitting in the passage-way, and at its other end a conical surface portion, and a guide member mounted in each of said passage-ways for slidably receiving the conical-shaped plunger end, each of said guide members having a restricted opening for limiting the movement of said plunger therethrough so as to prevent said plunger from projecting beyond the surface of the piston.

11. An hydraulic shock absorber comprising a casing and a piston therein and having a restricted by-pass and an auxiliary passage for the flow of liquid around the piston, said auxiliary passage having inlet and discharge ports, a pressure-operated valve normally closing the inlet port of said auxiliary passage and arranged to gradually reduce the effective area of the discharge port thereof as the valve is moved away from its normal position.

12. An hydraulic shock absorber comprising a casing and a cooperating piston and having a two-way restricted by-pass and two one-way auxiliary passages for the flow of liquid around the piston, said auxiliary passages having inlet and discharge ports, and oppositely-acting, pressure-operated check valves normally closing the inlet ports of the auxiliary passages, each check valve being arranged to gradually reduce the size of the discharge port of the corresponding passage as it is moved away from its normal position.

13. An hydraulic shock absorber comprising a casing, a piston therein forming two variable volume pressure chambers, means providing two passages for the flow of liquid between said chambers and each having inlet and discharge ports, oppositely-acting, spring-held check valves normally closing the inlet ports of said passages and each arranged to gradually reduce the effective area of the discharge port of the corresponding passage as it is moved away from its normal closed position.

14. An hydraulic shock absorber comprising a casing, a wing piston therein having an enlarged hub or bearing portion provided with two one-way passages extending therethrough, oppositely-acting, spring-held plunger valves arranged in and normally closing the respective passages and means associated with each valve for gradually reducing the effective cross-sectional area of the corresponding passage as the valve is moved away from its normal position.

GEORGE KENNETH McKEE.